Jan. 24, 1961  L. WOOLF  2,968,905
WHEEL OPERATED GRASS SHEARS
Filed July 7, 1959
2 Sheets-Sheet 2
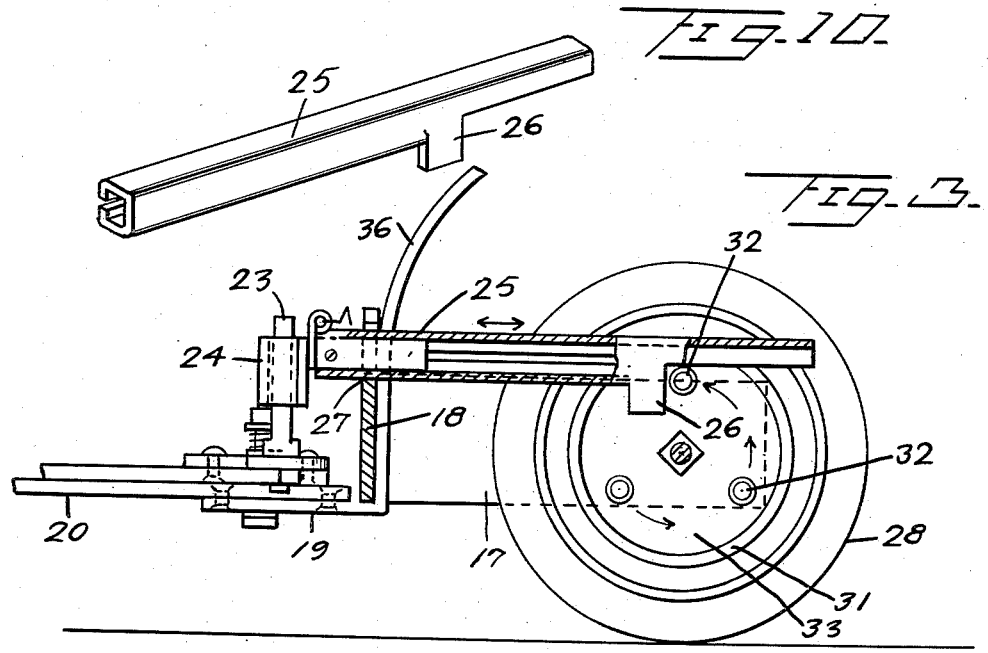
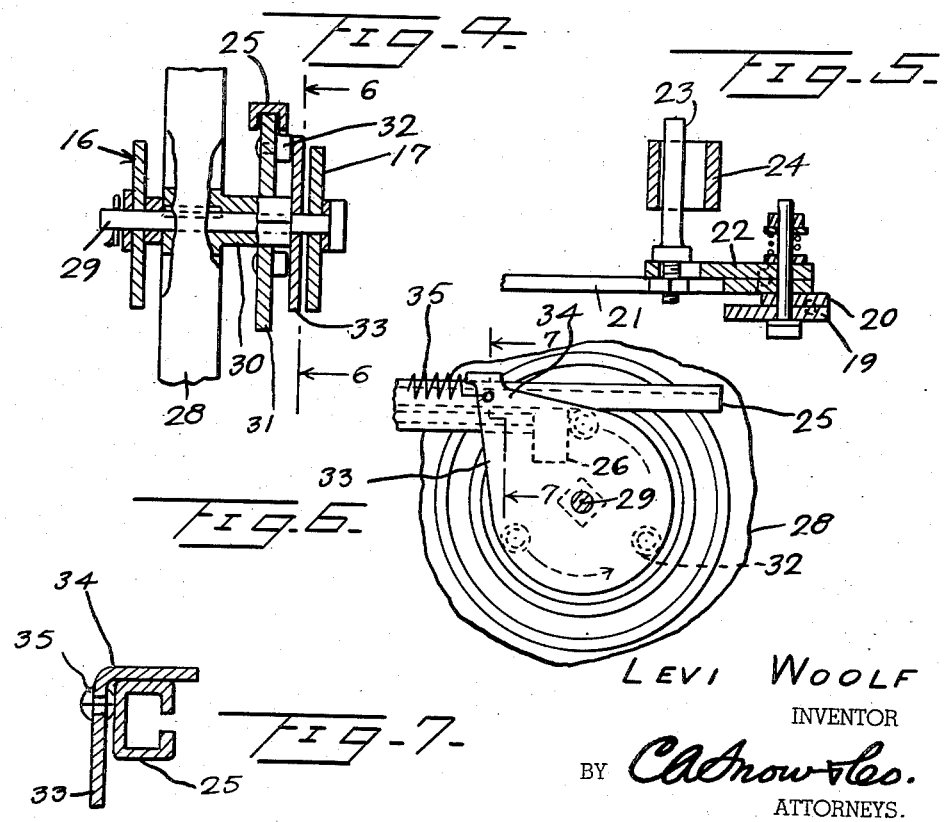
LEVI WOOLF
INVENTOR
BY *C. A. Snow & Co.*
ATTORNEYS.

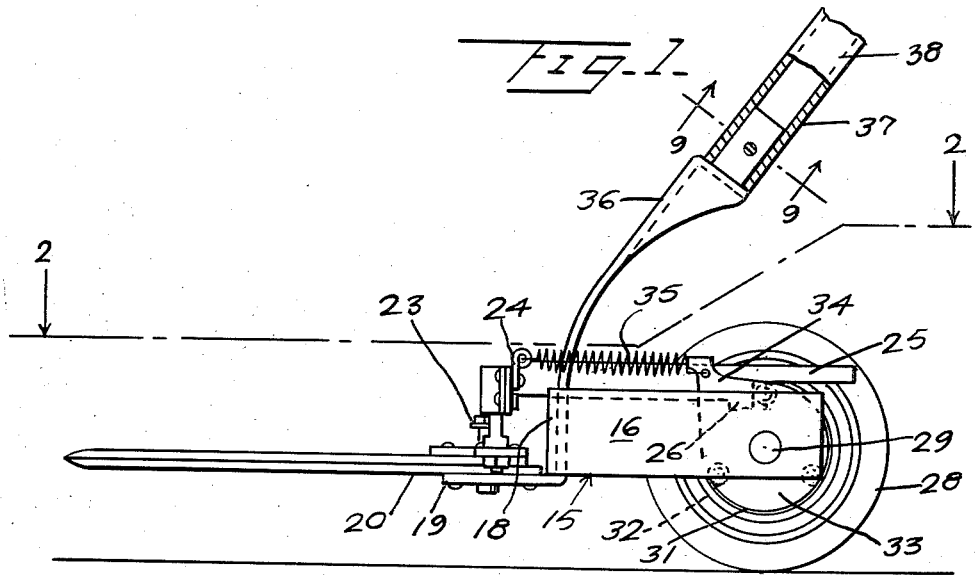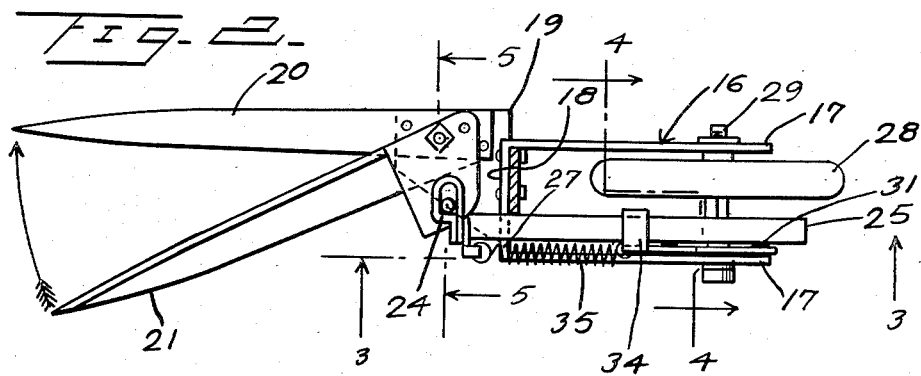

United States Patent Office 2,968,905
Patented Jan. 24, 1961

2,968,905
WHEEL OPERATED GRASS SHEARS
Levi Woolf, 587 W. Georgia Ave., Sebring, Ohio
Filed July 7, 1959, Ser. No. 825,481
2 Claims. (Cl. 56—248)

This invention relates to shears and more particularly to wheel operated shears used for cutting grass around the edges of a yard.

It is well known to those experienced in the art, that considerable trouble is had with the average wheel type of grass shears whereby one pushes it around the yard and at the same time operates the shearing mechanism by a hand lever and during this dual operation one has a tendency to either miss cutting some of the grass or else not cutting it as close to the edge of the yard as possible. With this defect in mind, it is therefore an important object of the invention to provide a wheel operated grass shear which will as its name implies automatically cut the grass as it is rolled over the ground without resistance to the ground.

Still another object of this invention is to provide a wheel operated grass shear that has a stationary blade that will act as a guide for the shears as the movable blade cuts the grass up close to a curve, wall or side of a house.

Still another object of this invention is to provide a wheel operated grass shear so constructed as to have a minimum of parts and is therefore low in manufacture and maintenance cost and at the same time one that will require little skill to assemble and operate.

With the foregoing and other objects in view which will appear as the description proceeds, the invention consists of certain novel details of construction and combination of parts hereinafter more fully described and pointed out in the claims, it being understood that changes may be made in the construction and arrangement of parts without departing from the spirit and intent of the invention as claimed.

Referring to the drawings:

Figure 1 is a side elevational view of this invention with part of the handle broken away and parts shown in section.

Figure 2 is a sectional view taken substantially along the line 2—2 of Figure 1 as viewed in the direction indicated by the arrows.

Figure 3 is an enlarged sectional view taken substantially along the line 3—3 of Figure 2 as viewed in the direction indicated by the arrows.

Figure 4 is an enlarged sectional view taken substantially along line 4—4 of Figure 2 as viewed in the direction indicated by the arrows.

Figure 5 is an enlarged sectional view taken substantially along the line 5—5 of Figure 2 as viewed in the direction indicated by the arrows.

Figure 6 is a sectional view taken substantially along the line 6—6 of Figure 4 as viewed in the direction indicated by the arrows.

Figure 7 is an enlarged sectional view taken substantially along the line 7—7 of Figure 6 as viewed in the direction indicated by the arrows.

Figure 8 is an enlarged fragmentary plan view of a detail of this invention.

Figure 9 is an enlarged sectional view taken substantially along the line 9—9 of Figure 1 as viewed in the direction indicated by the arrows.

Figure 10 is an enlarged perspective view of one detail of this invention.

Similar reference characters refer to similar parts throughout the several views of the drawings.

Having reference now to the drawings in detail, and particularly to Figures 1 and 2 there is generally indicated by the reference character 15 a frame work embodying U-shaped members 16 having rectangular side plates 17 and an end plate 18 to which is secured the upturned end of a blade supporting plate 19 that is trapezoidal in plan form. A grass cutting blade 20 is rigidly secured at one end to the supporting plate 19 while a movable grass cutting blade 21 having a lever plate 22 is rotatably secured to one end of fixed grass cutting blade 20 and supporting plate 19 to which it is secured as best shown in Figure 5 of the drawings. A stud 23 is vertically mounted on lever plate 22 in order to provide a means for operating the shears, since the stud is encompassed by an elongated strap-like member 24 which is secured to one end of a cam bar 25 which in turn has a lug 26 protruding vertically downwardly from one of its sides. Returning again to the end plate 18 it will be seen from a study of the drawings that this plate has an opening 27 through which is slidably supported one end of cam bar 25 in order that the end may press against the elongated strap member 24 and thus close the shears when lug 26 on cam bar 25 is moved forward as will hereinafter be described.

It is obvious that the wheel operated shears has only one wheel 28 whose axle 29 passes through a hub 30 to which is attached a circular plate 31 having cam rollers 32 spaced around its periphery in such a manner as to repeatedly come into contact with lug 26 of cam bar 25 when the wheel is rotated.

It is obvious from examination of Figure 4 that the cam bar 25 is located slightly above and over the top of the edge of the stated circular plate 31. A spring holding plate 33 is slidably mounted on the stated hub 30 right next to one of the side plates 17, a portion 34 of the stated spring holding plate 33 being bent over the top of the cam bar 25. One end of a tension spring 35 is attached to the portion 34 of plate 33 while the other end of the spring is secured to one end of the elongated strap member 24, as shown in Figure 2.

A handle support member 36 has one end rigidly secured to end plate 18, while the other end of this curved member terminates in a socket 37 in which a handle 38 is secured. It is obvious from the detail construction of this wheel operated shears that when the shears is rolled along the ground, the cam rollers 32 will come into contact with and move forward the lug 26 of cam bar 25, which will in turn move the elongated strap member 24 forward, and thus close the grass cutting blade 21. While the cam roller 32 has moved forward beyond the point of contact with lug 26, the tension spring 35 secured to portion 34 of spring holding plate 33 at one end, and to the elongated strap member 24, as previously stated, will pull the grass cutting blade 21 to its open position as clearly shown in Fig. 2 of the drawings. The operation will be repeated as soon as the next one of the cam rollers 32 comes into contact with the lug 26 of cam bar 25, which will again be back in the position shown in Fig. 6.

From the foregoing it will now be seen that there is herein provided an improved wheel operated shears which accomplishes all of the objects of this invention, and others, including many advantages of great practical utility and commercial importance.

As many embodiments may be made of this inventive concept, and as many modifications may be made in the embodiment hereinbefore shown and described, it will

I claim:

1. A wheel supported grass shears comprising a frame, a wheel mounted at the rear of said frame having a hub, a circular plate secured on said hub, a plurality of spaced cam rollers extending laterally from said plate, a stationary blade and a cooperating pivoted blade projecting forwardly from said frame, a cam bar mounted for horizontal sliding movement on said frame, a lever plate secured to said pivoted blade, a stud rising from said lever plate, a strap loosely encircling said stud connected to one end of said cam bar, connecting said stud and cam bar, a depending lug on the other end of said cam bar engageable with said cam rollers as said wheel rotates, moving said pivoted blade with respect to the stationary blade in a cutting operation, and a coiled spring operatively associated with said cam bar and said stud normally biasing said pivoted blade to an open position.

2. A wheel supported grass shears comprising a frame, a wheel mounted at the rear of said frame, having a hub, a circular plate secured on said hub, a plurality of spaced cam rollers extending laterally from said plate, a stationary blade and cooperating pivoted blade projecting forwardly from said frame, a cam bar mounted for horizontal sliding movement on said frame, a vertical stud, means for securing said stud to said pivoted blade, laterally of the pivot point of said pivoted blade, a contractile spring operatively associated at one of its ends to said cam bar, means for connecting the other end of said spring to said stud, a lug on said cam bar engageable successively with said cam rollers as said wheel rotates, moving said pivoted blade into cutting relation with said stationary blade, and said spring adapted to bias said pivoted blade to an open position upon disengagement of a cam roller with said lug on said cam bar.

References Cited in the file of this patent

UNITED STATES PATENTS

| 1,382,441 | Richendifer | June 21, 1921 |
| 2,521,293 | Hunt et al. | Sept. 5, 1950 |
| 2,574,858 | Carter | Nov. 13, 1951 |
| 2,812,631 | Koch | Nov. 12, 1957 |

FOREIGN PATENTS

| 161,462 | Australia | Feb. 24, 1955 |